Figure 1:
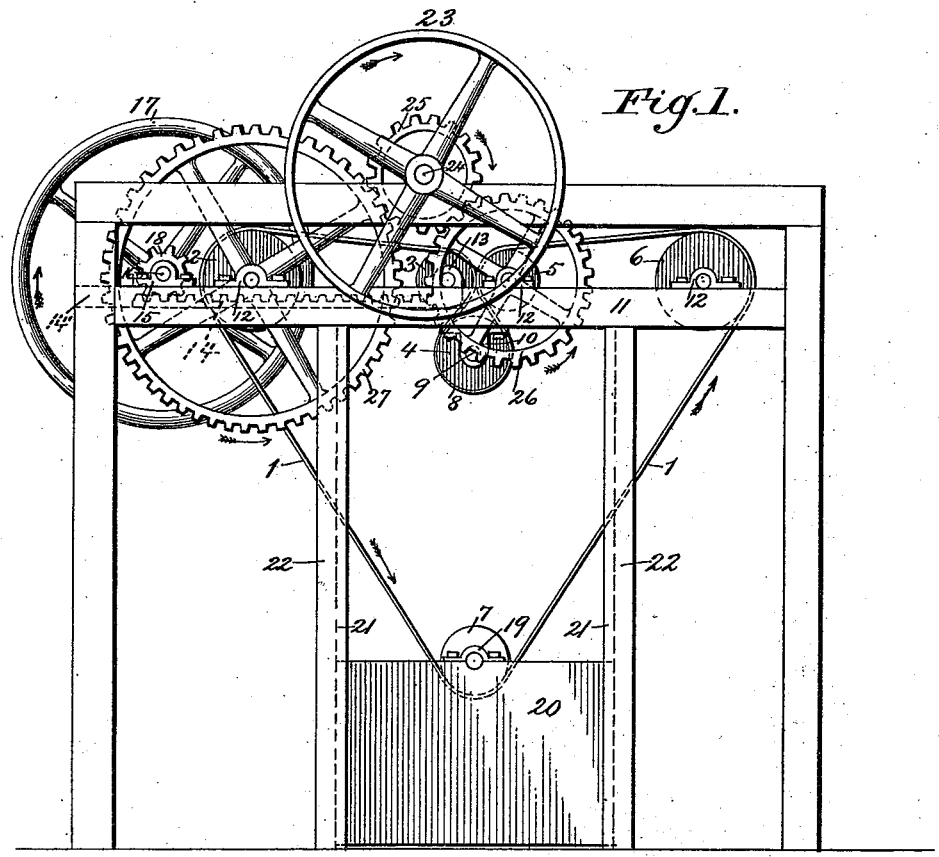

(No Model.)   2 Sheets—Sheet 1.

J. W. GRAVES.
BALING PRESS FOR COTTON, &c.

No. 510,387.   Patented Dec. 5, 1893.

Witnesses
T. R. Stuart
H. Y. Davis

Inventor
J. W. Graves.
By Marble, Mason & Canfield,
Attorneys.

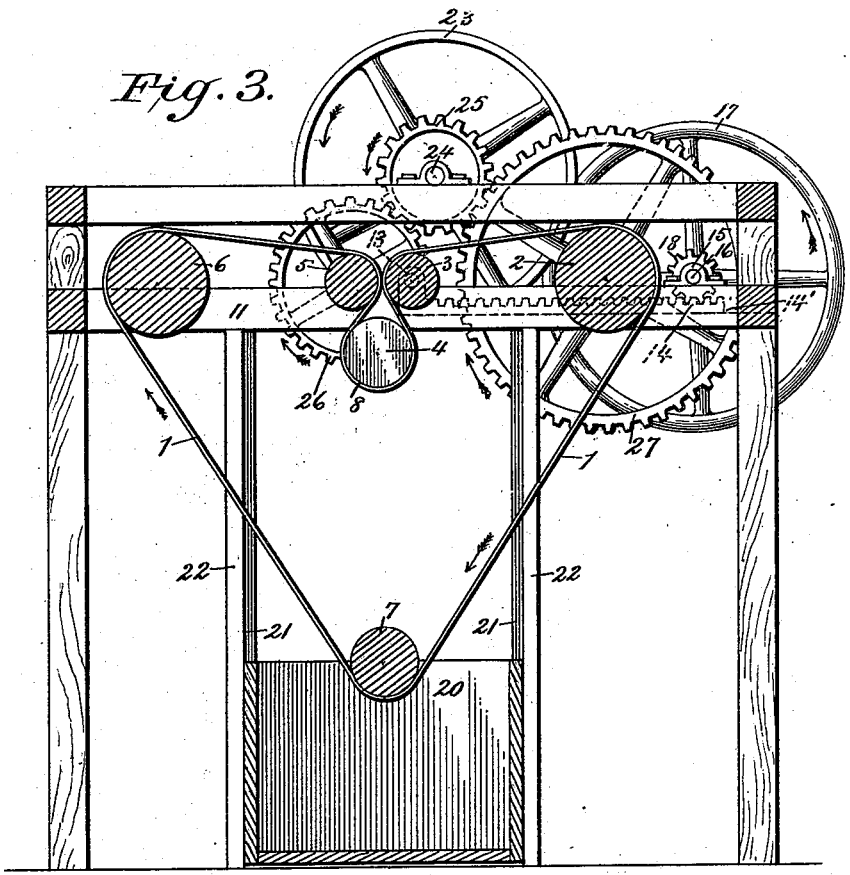

UNITED STATES PATENT OFFICE.

JOHN W. GRAVES, OF LITTLE ROCK, ARKANSAS, ASSIGNOR, BY DIRECT AND MESNE ASSIGNMENTS, TO P. E. BRUGMAN, OF SAME PLACE, JAMES K. JONES, OF WASHINGTON, AND THOMAS LANIGAN, OF FORT SMITH, ARKANSAS.

BALING-PRESS FOR COTTON, &c.

SPECIFICATION forming part of Letters Patent No. 510,387, dated December 5, 1893.

Application filed March 17, 1891. Renewed May 5, 1893. Serial No. 473,143. (No model.)

*To all whom it may concern:*

Be it known that I, JOHN W. GRAVES, a citizen of the United States, residing at Little Rock, in the county of Pulaski and State of Arkansas, have invented certain new and useful Improvements in Baling-Presses for Cotton, &c.; and I do hereby declare the following to be a full, clear, and exact description of the invention, such as will enable others skilled in the art to which it appertains to make and use the same.

My invention relates, generally, to presses for baling cotton and other fibrous materials and, particularly, to improvements in that class thereof in which the fibers are compressed into cylindrical bales. In my improved press this result is accomplished by feeding the fibers in the form of a bat or thin sheet into the press, winding it around and around upon itself, or layer upon layer, and simultaneously subjecting the same to pressure as it is formed into a bale. The fibers will thus be closely pressed together and acquire density in proportion to the size of the bale and the amount of pressure applied thereto.

My invention consists, first, in improved mechanism for baling cotton and other fibrous materials, in which the fibers, in the form of a thin bat or sheet, are subjected to continuous pressure during the baling operation, said mechanism including a weighted, endless belt, within the loop or bight of which the bale is formed by continuous accretion or rotation of the fibers and by effecting its compression in detail, or layer upon layer, as it is fed to the bale, which is preferably effected, when baling cotton, by delivering the sheet or bat into the press from the condenser of a gin in an unbroken condition; second, in improved mechanism for causing the bat or sheet of fiber, as it is fed into the press, to be subjected to constant compression, which, never being relaxed until the bale is finished, results in the greatest attainable density of the material and in the layers throughout the bale constituting retaining bands for those wound interiorly thereof, which are held or bound by the layers outside; third, in improved mechanism for permitting the loop or bight of the belt to automatically accommodate itself to the increasing size of the bale; fourth, in improved mechanism for sustaining the increasing size and weight of the bale in the same plane, while permitting the loop or bight of the belt to revolve freely upon and around said bale during its formation; fifth, in improved mechanism for forming the loop or bight of the belt and retaining its form during the completion of the bale, and, sixth, in the special construction and arrangement of the devices employed as accessorial and essential to the operation of the main mechanisms employed for carrying out the objects or purposes of this invention, as hereinafter fully disclosed in the description, drawings and claims.

The objects of my invention are, first, to so press the bat or sheet, as it is delivered from the cotton-gin condenser or elsewhere, that its fibers will not be broken or subjected to any other deteriorating influence, and, also, to avoid the danger of fire, which is inseparable from the use of lint rooms; second, to effect such condensation of the fiber, in the first instance, as will place it in proper condition for ocean and other shipment, and thus obviate the present enormous expense of hauling it to storage warehouses and compresses, and, also, of compressing or repressing plantation bales; third, to effect the compression or baling of the fiber by winding the bat smoothly, or without tangling or breaking its fibers, around upon itself, or layer upon layer, so that the pressure upon the fiber will constitute the main retaining element or holding means for the completed bale, and so that any light wrapping or covering, which will arrest the expansion of the outer layer of the bat, will also prevent all expansion of the rest of said bale; also, the fiber will be left in such condition, that, when said covering has been removed, the rotation of said bale can be reversed and the bat unwound in a continuous or unbroken sheet, but in a more compressed condition than when it was originally delivered from the condenser; fourth, to so wind and press the bat that its edges, at the ends of the bale, will show a fac-simile of its entire contents and be open to inspection and sampling, without mutilating said bale or disturbing its covering or binding, and, fifth, to provide a machine or press at a moderate cost, which shall be simple in construction and certain or reliable in operation. These objects are accomplished by the mechanism illustrated in the accompanying drawings forming part of this specification, in which the same reference numerals indicate the same or corresponding parts, and in which—

Figure 2:
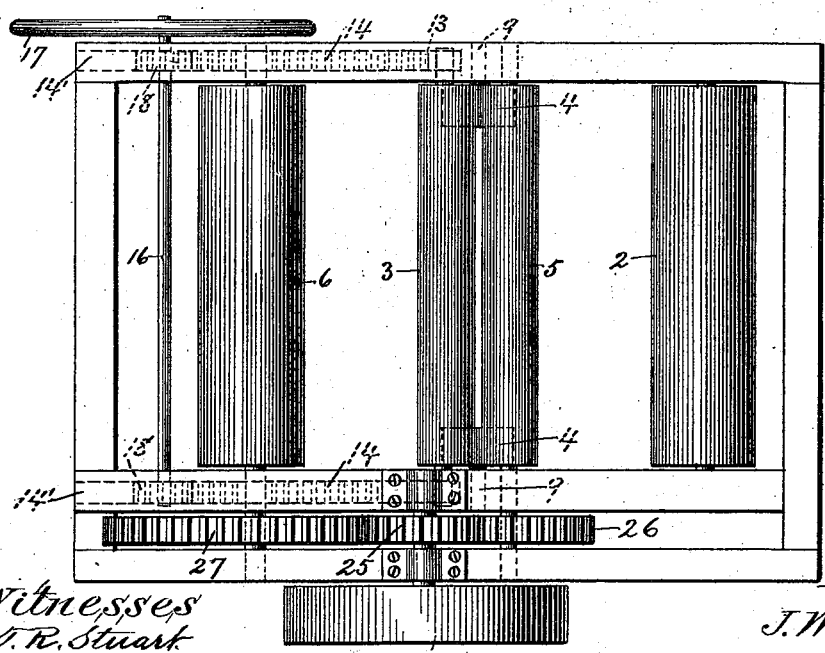

Figure 1 represents a side elevation of my improved baling press, showing the frame, the driving gear, the endless, compression belt and the weight-box; Fig. 2 a top plan view of the same, said belt and weight-box being omitted, and Fig. 3, a longitudinal section of the parts of the press shown in Fig. 1.

In the drawings, the numeral 1 indicates the endless, retaining and compression belt, which passes over the rollers 2 and 3, down and around the two, revoluble heads or disks 4, up and over the rollers 5 and 6, down and around or under the tension-roller 7, and thence upward to the starting point. This arrangement of the endless belt forms therein, beneath the two parallel and horizontal rollers 3 and 5, and around said heads or disks, which project inwardly, the loop or bight 8, within which, and between the inner faces of said heads or disks, the bat or sheet of fibers is received as it passes between the rollers 3 and 5 for undergoing the operation of baling. These heads or disks are mounted upon the inwardly-extending, short shafts 9, which are journaled in the bearings 10 secured to the under sides of the lower beams 11, as shown in Fig. 1; also, these heads or disks project suitable distances inwardly and into the ends of the belt loop or bight for holding the same normally open or in condition for receiving the necessary amount of fiber for forming a roll for starting and finishing a solid, cylindrical bale.

The shafts of the rollers 2, 5 and 6 are journaled in the fixed bearings 12, which are secured upon the lower beam 11 of the frame, while the shaft of the roller 3 is journaled in the upright bearings 13, which are formed with or attached to the inner ends of the horizontally-movable rack-bars 14, which are seated in suitable guide-grooves 14', formed in said lower beams 11 of the frame, as shown in dotted lines in Figs. 1 and 2. At the rear ends of said beams are secured the bearings 15, in which is journaled the transverse shaft 16, which is provided with the hand-wheel 17 at one end and with the two pinions 18, which engage with the rack-bars 14 and reciprocate or slide the same in and out for changing the positions of the roller 3, or for the purposes, respectively, of permitting the formation of a new bale within the loop or bight of the belt and of the removal therefrom of a completed bale.

During the formation of the bale, or while it is increasing in size or diameter, it is necessary to produce the proper amount of pressure thereon by the bight or loop 8 of the endless belt. This is accomplished by means of the tension-roller 7, which is journaled in the bearings 19 secured to the ends of the weight-box 20, which may be supplied with any kind and quantity of ballast, and which is guided in its upward and downward movements by its corners fitting into the triangular channels 21 formed in the inner legs 22 of the frame.

The operating or driving mechanism of my improved baling-press consists of the power receiving and transmitting pulley 23, which is secured to the outer end of the short shaft 24, upon which is also secured the small gear-wheel 25, which meshes with and drives in opposite directions the two larger gear-wheels 26 and 27 on the outer ends of the shafts of the rollers 5 and 2, whereby said gear-wheels and rollers and the endless belt 1 will be positively driven in the direction of the arrows on the drawings.

In addition to what is obvious and hereinbefore described in relation to the advantages and operation of my improved baling-press, it may be further stated that the thin sheet or bat of fibers is uniformly fed from the condenser of a cotton-gin, or other source, and passed down through the small space between the two parallel and horizontal rollers 3 and 5 and into the loop or bight of the endless belt, where it is turned or wound over and over upon itself, layer upon layer, until the bale is completed. During this operation the layers of the bat forming the bale gradually become dense and more dense, as more layers are added, until the bale distends the loop or bight of the belt to the required diameter for the completed bale. This distention or expansion of said loop or bight, however, does not begin until its hollow, cylindrical space between the heads or disks 4 becomes filled with a roll of fibers greatly reduced in density, but, when further accumulation of said fibers occurs, there will be corresponding expansion of the loop or bight of said belt, which will result in gradually raising the tension-roller 7 and the weight-box 20, which, being continued, will cause the formation of the desired size of bale between said heads or disks and within the loop or bight of said belt. The distention or expansion of the loop, however, is very little until the size and density of the roll therein become sufficient to overcome the resistance of said weight-box. As the feeding of the fibrous bat into the loop is uniform, the roll at first only increases in volume, but then slowly begins to distend said loop, which results in raising said weight-box and in gradually increasing the density of the bale. As this feeding and winding of the bat continues, the weight in said box should be proportioned to the extent of surface of the belt against the circumference of the bale, which may be accomplished by placing additional weight in said box at suitable intervals. After the bale has reached the desired size, the bat or sheet of fiber is cut or broken off and a wrapper or cover, of any suitable or usual material, is fed through the small space between the rollers 3 and 5 and wound around the bale, after which a few wires are passed around said bale, in the same manner, and twisted together at their ends, and thus the bale is prevented from expansion and unwinding; then, the hand-wheel 17 and the pinions 18 secured to the shaft 16 are revolved forwardly, which results in drawing the rack-bars 14 and the roller 3 rearwardly and in opening the loop or bight of the belt for the removal of said bale; then said hand-wheel, pinions and shaft are revolved rearwardly for sliding said rack-bars and roller forwardly and again forming said loop or bight around the heads or disks 4 for the formation of a new bale, and the press is in proper condition for repeating the operation of baling.

Having thus fully described my improved baling-press for cotton and other fibrous materials, its advantages and operation, what I claim as new is—

1. In a baling-press for cotton and other fibrous material, the combination, with a suitably supported and driven endless and weighted belt, of the revoluble heads or disks arranged to form a cylindrical loop or bight therein, and a pair of parallel and horizontal rollers arranged above said loop or bight substantially as described.

2. In a baling-press for cotton and other fibrous material, the combination, with a suitably supported and driven endless belt, of the revoluble heads or disks arranged to form a cylindrical loop or bight therein, and a pair of parallel rollers arranged in the same horizontal plane and above said loop or bight, substantially as described.

3. In a baling-press for cotton and other fibrous material, the combination, with a suitably supported and driven endless belt, of the revoluble heads or disks arranged to form a cylindrical loop or bight therein, and a pair of parallel rollers arranged in the same horizontal plane above said loop or bight, one of said rollers being horizontally movable, substantially as and for the purpose described.

4. In a baling-press for cotton and other fibrous material, the combination, with a suitably supported and driven endless belt, of the revoluble heads or disks arranged to form a cylindrical loop or bight therein, a pair of parallel rollers arranged in the same horizontal plane above said loop or bight, and a tension-roller arranged below the same, substantially as described.

5. In a baling-press for cotton and other fibrous material, the combination, with a suitably supported and driven endless belt, of the revoluble heads or disks arranged to form a cylindrical loop or bight therein, a pair of rollers arranged above said loop or bight, and a tension roller arranged below the same, one of said pair of rollers being horizontally movable, substantially as described.

6. In a baling-press for cotton and other fibrous material, the combination, with a suitably supported and driven endless belt means for forming the same into a cylindrical loop or bight, and a pair of rollers arranged above said loop or bight, of the horizontally-movable rack-bars for reciprocating one of said rollers and opening and closing said loop or bight, substantially as and for the purpose described.

7. In a baling-press for cotton and other fibrous material, the combination, with a suitably supported and driven endless and weighted belt, of the revoluble heads or disks arranged to form a cylindrical loop or bight therein, a pair of parallel rollers arranged in the same horizontal plane above said loop or bight, and the horizontally-movable rack-bars for reciprocating one of said rollers and opening and closing said loop or bight, substantially as and for the purpose described.

8. In a baling-press for cotton and other fibrous material, the combination, with a suitably supported and driven endless belt, of the revoluble heads or disks arranged to form a cylindrical loop or bight therein, a pair of rollers arranged above said loop or bight, a pair of parallel rollers arranged in the same horizontal plane and above said loop or bight, a tension-roller arranged below the same, and the horizontally-movable rack-bars for reciprocating one of said upper rollers and opening and closing said loop or bight, substantially as and for the purpose described.

9. In a baling-press for cotton and other fibrous material, the combination, with a suitably supported and driven endless belt, of the revoluble heads or disks arranged to form a cylindrical loop or bight therein, a pair of rollers arranged above said loop or bight, a tension-roller and weight-box arranged below the same, the horizontally-movable rack-bars for reciprocating one of said upper rollers, and gearing for operating said rack-bars, substantially as and for the purpose described.

10. In a baling-press for cotton and other fibrous material, the combination, with a suitably supported and driven endless belt, of the revoluble heads or disks arranged to form a cylindrical loop or bight therein, a pair of rollers arranged above said loop or bight, a tension-roller arranged below the same, the horizontally-movable rack-bars for reciprocating one of said upper rollers, and gearing for operating said rack-bars, said gearing consisting of the pinions engaging with said rack-bars and the transverse shaft and hand-wheel for revolving said pinions, substantially as described.

11. In a baling-press for cotton and other fibrous material, the combination, with a suitably supported and driven endless and weighted belt, of the revoluble heads or disks arranged to form a cylindrical loop or bight therein, a pair of parallel rollers arranged in the same horizontal plane and above said loop or bight, and means for revolving said belt and its loop or bight and the heads or disks projecting into the ends thereof, substantially as described.

12. In a baling-press for cotton and other fibrous material, the combination, with a suitably supported and driven endless belt, of the revoluble heads or disks arranged to form a cylindrical loop or bight therein, a pair of parallel rollers arranged in the same horizontal plane and above said loop or bight means for revolving said belt and its loop or bight and the heads or disks projecting into the ends thereof, and means for regulating the tension of said belt, and its loop or bight, substantially as and for the purpose described.

13. In a baling-press for cotton and other fibrous material, the combination, with a suitably supported and driven endless belt, of the revoluble heads or disks arranged to form a cylindrical loop or bight therein a pair of parallel rollers arranged in the same horizontal plane and above said loop or bight, means for revolving said belt and its loop or bight and the heads or disks projecting into the ends thereof, and means for regulating the tension of said belt and its loop or bight, and means consisting of the tension-roller and weight-box, substantially as described.

14. In a baling-press for cotton and other fibrous material, the combination, with a suitably supported and driven endless belt, of the revoluble heads or disks arranged to form a cylindrical loop or bight therein, and means for revolving said belt and its loop or bight and the heads or disks projecting into the ends thereof, said means comprising the horizontally arranged rollers, gear-wheels for revolving the same, a gear-wheel intermeshing therewith and a power receiving and transmitting pulley for imparting rotation to said gear-wheels, rollers, belt, its loop or bight and the heads or disks projecting into the ends of the latter, substantially as described.

15. In a baling-press for cotton and other fibrous material, the combination, with a suitably supported and driven endless belt, of the revoluble heads or disks arranged to form a cylindrical loop or bight therein, and means for revolving said belt and its loop or bight and the heads or disks projecting into the ends thereof, said means comprising the horizontally-arranged rollers 2, 3, 5, and 6, the gear-wheels 27 and 26, the smaller gear-wheel 25 intermeshing therewith, the power receiving and transmitting pulley 23 for imparting rotation to said gear-wheels, rollers, belt, its loop or bight and the heads or disks projecting into the ends of the latter, the tension-roller 7 and the weight-box 20, substantially as described.

16. In a baling-press for cotton and other fibrous material, the combination, with a suitably supported and driven endless belt, of the revoluble heads or disks arranged to form a cylindrical loop or bight therein, and means for revolving said belt and its loop or bight and the heads or disks projecting into the ends thereof, said means comprising the horizontally-arranged rollers, 2, 3, 5, and 6, the gear-wheels 27 and 26, the smaller gear-wheel 25 intermeshing therewith, the power receiving and transmitting pulley 23 for imparting rotation to said gear-wheels, rollers, belt, its loop or bight and the heads or disks projecting into the ends of the latter, the tension-roller 7, the weight-box 20, and means for reciprocating said roller 3 horizontally, substantially as described.

17. In a baling-press for cotton and other fibrous material, the combination, with a suitably supported and driven endless belt, of the revoluble heads or disks arranged to form a cylindrical loop or bight therein, and means for revolving said belt and its loop or bight and the heads or disks projecting into the ends thereof, said means comprising the horizontally-arranged rollers, 2, 3, 5, and 6, the gear-wheels 27 and 26, the smaller gear-wheel 25 intermeshing therewith, the power receiving and transmitting pulley 23 for imparting rotation to said gear-wheels, rollers, belt, its loop or bight and the heads or disks projecting into the ends of the latter, the tension-roller 7, the weight-box 20, and means for reciprocating said roller 3 horizontally, said means consisting of the rack-bars 14, the pinions 18, the transverse shaft 16, and the hand-wheel 17, substantially as described.

In testimony whereof I affix my signature in presence of two witnesses.

JOHN W. GRAVES.

Witnesses:
 TOM R. STUART,
 P. J. MCHENRY.